United States Patent [19]

LaBarbera

[11] 4,170,316

[45] Oct. 9, 1979

[54] OVER-CAP CLOSURE DEVICE

[76] Inventor: Mannie LaBarbera, 160 Hunt's La., Chappaqua, N.Y. 10514

[21] Appl. No.: 837,932

[22] Filed: Sep. 29, 1977

Related U.S. Application Data

[63] Continuation-in-part of Ser. No. 529,642, Dec. 5, 1974, abandoned.

[51] Int. Cl.² .......................................... B65D 41/16
[52] U.S. Cl. .................................. 220/306; 220/353; 222/182; D9/285
[58] Field of Search .............................. 220/306, 353; 215/DIG. 1; 222/182; D9/285

[56] References Cited

U.S. PATENT DOCUMENTS

| | | | |
|---|---|---|---|
| D. 142,622 | 10/1945 | Derham | D9/285 |
| D. 147,261 | 10/1945 | Derham | D9/285 |
| D. 189,557 | 1/1961 | Soffer | D9/285 |
| 2,713,872 | 7/1955 | Juengling | 222/182 |
| 2,973,881 | 3/1961 | Ostrowitz | 220/306 |
| 3,085,705 | 4/1963 | Varney | 215/DIG. 1 |
| 3,167,217 | 1/1965 | Corsette | 222/182 |
| 3,203,577 | 8/1965 | Parker | 220/306 |
| 3,450,299 | 6/1969 | LaBarbera | 220/353 |
| 3,684,124 | 8/1972 | Song | 222/182 |
| 3,844,448 | 10/1974 | Sette | 222/182 |

FOREIGN PATENT DOCUMENTS

| | | | |
|---|---|---|---|
| 645699 | 6/1966 | Canada | 222/182 |
| 32260 | 10/1960 | Finland | 220/306 |

*Primary Examiner*—Ro E. Hart

[57] ABSTRACT

The invention relates to a one-piece molded plastic over-cap, collar, container, or housing, of the type that preferably snaps down over or within an aerosol type spout or screws onto the spout, the over-cap differing from prior devices in that the resilient wedge projections extending about radially inwardly have upper-edge faces separate from and space away from and extending beneath the inner surface of the top horizontal inner wall of the cap device such that the molding process thereof and the resulting product from the molding process does not result in a top surface characterized by sink marks characteristic of prior art caps, the sink marks resulting from contraction of the cooling plastic of the respective wedge projections, the contracting plastic pulling downwardly on the top of the cap at the particular locations at which the radially inwardly wedge projections are in prior art caps positioned and integral with the upper wall, the present over-cap devices being free of such contraction-sink indentations in the top surface of the cap top, thereby being beneficially receptive of advertising, labelling or the like, in contrast with prior art caps in which such labelling on the top surface thereof was unsatisfactory if not impossible to effect because of the several sink-recesses characterizing an uneven surface not receptive of printing or the like, and having lower portions of readially-inwardly facing projection edges extending and being tapered radially to an extent further than an upper portion thereof, thus forming a catch to latch onto a vessel's mouth structure.

8 Claims, 20 Drawing Figures

OVER-CAP CLOSURE DEVICE

This invention is a continuation-in-part of U.S. Ser. No. 529,642 filed Dec. 5, 1974 now abandon, and relates to an overcap device such as a cap of the type that snaps around or into or screws downwardly onto or into an aerosol or other bottle or other similar type vesssel where it is desirable to seal or at least place a cup over the top thereof.

BACKGROUND OF THE INVENTION

Prior to the present invention, the closest prior art to which this invention is directed is the inventor's own U.S. Pat. No. 3,450,299 which is directed to wedge-like projections extending about radially inwardly from the lateral inner walls of a cap, with the projections being molded as an integral part of the cap itself and extending downwardly from the upper inner surface of the top of the cap, this heretofore being a result of the sole known method of making the caps of this type, as well as lack of insight in the art as to how to better even-surfaced top outer walls as contrasted to the uneven upper outer top walls with its multiple sinks therein. These sink marks of prior caps of this type make it difficult if not impossible to print satisfactorily any pertinent information or sales or identifying data or design thereon because of the uneven surface brought about by the contraction of cooling plastic at the points of union of the inner wedge-like projections with the inner top wall of the cap during the injection molding thereof.

SUMMARY OF THE INVENTION

An object of the present invention is to overcome one or more of the difficulties of the type discussed above.

Another object of the present invention is to obtain a new and efficient process of making a novel over-cap device overcoming the above-type problems.

Another object is to obtain new types of mounting for the over-cap devices having inwardly extending projections of the wedge or hook type.

Another object is to obtain a molded over-cap device having a flat upper-face with a level face adopted for improved printing thereon.

Another object is to obtain an over-cap having improved wedge-fastening mechanism.

Other objects become apparent from the preceeding end following disclosure.

One or more objects of the present invention are obtained by the invention as defined herein.

Broadly the invention relates to an over-cap closure means which characteristically snaps over, in a preferred embodiment, a spout or bottle opening by having inwardly radially extending projections which extend inwardly from the inner lateral walls of the cap into space beneath the upper inner top horizontal wall, and the upper projection edge being free from attachment to and preferably spaced from a predetermined distance from the upper inner top horizontal wall. In a preferred embodiment and further improvement, radially inwardly-facing edges of the projections are obliquely slanted and tapered inwardly forming a catch as a latch thereby facilitating anchoring the wedge-projections onto a container's mouth structure. These projections may be any of a variety of shapes, some of which have greater resilient-like action because of their respective shapes than those of prior art or of other embodiments of the present invention and being subject to in some embodiments wedging against the outer wall of a spout or bottle top whereas for other embodiments of the invention the downwardly extending portions of the radially inwardly extending projections serving to hook into the inner walls of the spout of the vessel thereby wedgedly anchoring the cap thereon. As a result of the radially inwardly extending projections being separate from attachment to the lower surface of the top of the cap, the cooling contraction of the projections during the molding of the cap under which the respective projections are located, thereby avoiding any possibility of resulting sinks in the upper surface of the cap top wall since there has been no downwardly-pulling contraction associated with the novel cap of the present invention. As a result of this new type overcap, it is therefor possible to print indican or advertising or promotional material or designs or the like on the level face of the top of the cap which when molded is a smooth flat surface susceptible of such even and complete printing or other type of labelling.

As a part of the present invention, in order to obtain and overcap device of the type described above, it is critically necessary to employ a novel process of molding the same. The process requries that there be a lower male insert die and an upper female die into which the male die is insertable and in the molding-preparatory state spaced from the inner walls of the female die in order to provide space for the filling thereof with flowable plastic hardenable composition. However, in order to obtain the projections spaced from the top inner cap wall, the male die includes a plurality of slots about each extending about axially along the periphery at predetermined points of the male die inpositions corresponding to the desired locations of the projections of the cap to be molded, each slot having reciprocateably mounted therein for axial movement upwardly and downwardly therein an insert which includes an indentation in one side thereof such that flowable material from the space between male and female die may flow into the recess between the insert and the slot wall in order to form the projection of the predetermined desired shape. The male die and the female die are preferably each tapered upwardly, relative to their positions when the male die is inserted into the female die, such that upon completion of the molding the male die is withdrawable from the inside of the formed cap and the female die is withdrawable from over the molded cap, but it should be noted that because the insert in the male die extends between the inner top of the cap and the recess in the side of the insert—within the inserts at the same time that the male die is withdrawn; therefore as a part of the present invention, the inserts which preferably also slanted slightly inwardly toward their top (adjacent the inner top wall of the cap to be molded) distal ends are further caused to move towards the center of the circle formed by the male die when the male die is withdrawn and/or when the inserts are forced to move, relative to the male die, in an axial upwardly direction in the direction of the top of the molded cap—it being necessary for also the molded cap and the female die concurrently to move upwardly with the upward movement of the plurality of inserts, whereby the axial movement of the respective inserts leaning inwardly during the axial movement the respective upwardly moving inserts move closer to the central position and closer to each other away from the lateral walls of the molded cap and away from the molded projection, and/or irrespective of whether the insert slots and insert therein lean inwardly, after withdrawal of the male die such that the inserts are extended from the distal upper end of the male die but with each insert still partially within the male die slot, the twisting of the male die and thereby also the forced twisting of the inserts carried therewith causes the respective inserts to each be pulled away from the molded projection such that the insert thereafter are located away from and between the projection allowing the cap to thereafter be lifted from around the disengaged inserts; the cap is, after projection disengagements typically lifted by a mold cap support located under the bottom lip of the cap—this cap having been a part of the mold enclosure sealing off the space between the bottom of the female die and the peripherally outer wall of the male die, the cap support being raised together with the female die before or after which the female die itself is raised from over the molded cap.

The invention may be better understood by reference to the following Figures.

THE FIGURES

Figure 3A:
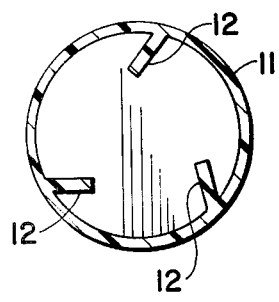
FIG. 3A illustrates a typical cross-sectional view as taken along lines 3—3 of FIG. 2.
Figure 3B:
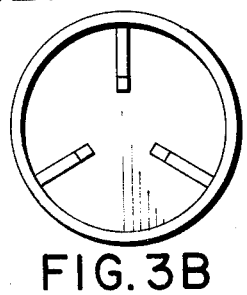
Figure 3C:
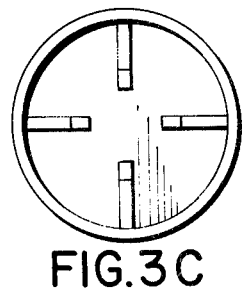
Figure 3D:
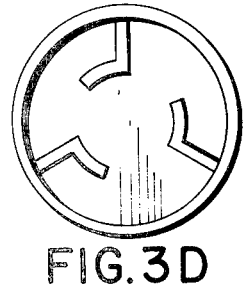

FIGS. 3B, 3C, and 3D illustrate typical variation from the shape of the FIG. 3A embodiment.

Figure 4:
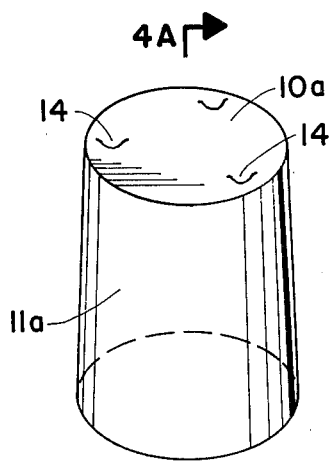
Figure 4A:
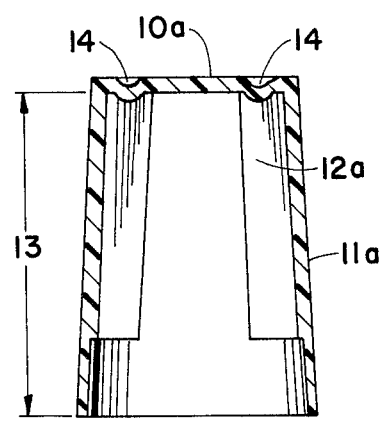

FIG. 4 and FIG. 4A each illustrate different view of a typical prior art cap existing prior to the present invention, the FIG. 4 illustrating a perspective view and the FIG. 4A illustrating a cross-sectional view as taken along lines 4A—4A on FIG. 4.

Figure 5:
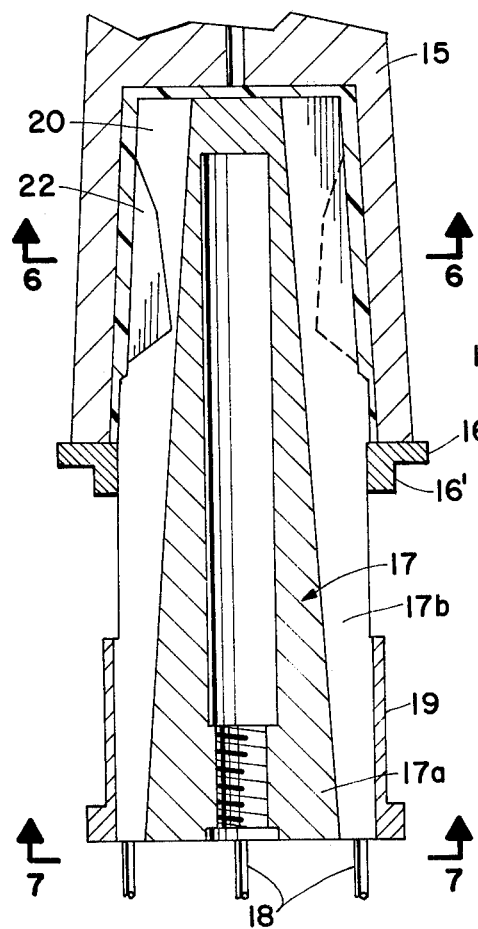

FIG. 5 illustrates in cross-sectional view a side view of a typical female die having a male die inserted upwardly thereinto with insert slideably fitted into slots extending axially of the male die.

Figure 6:
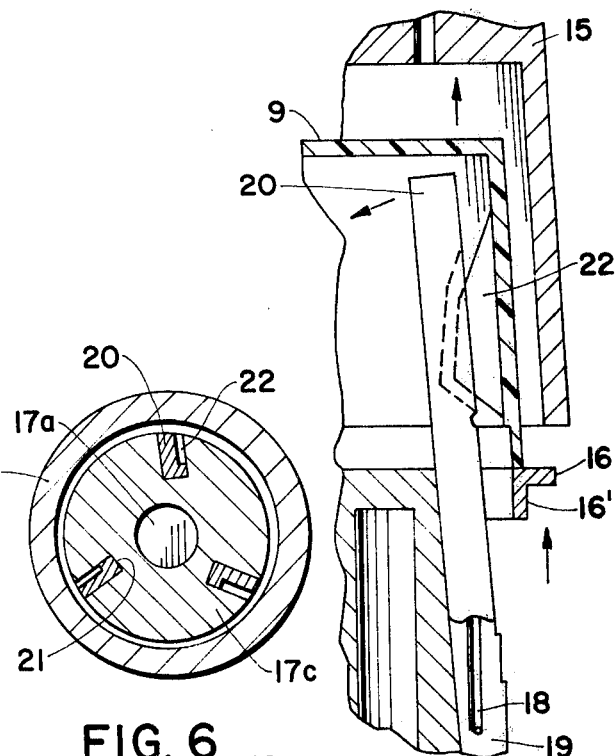

FIG. 6 illustrates a view taken along lines 6—6 of FIG. 5, showing the arrangement of the female die, the male die, and the projection-forming slideable inserts within the slots of the male die.

Figure 7:
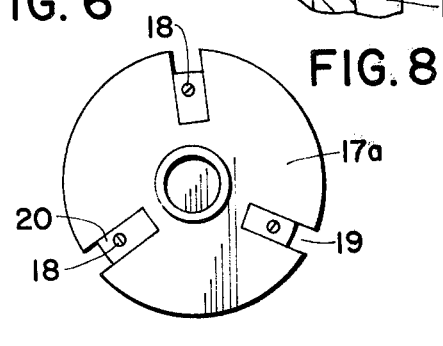

FIG. 7 illustrates a view taken along lines 7—7 of FIG. 5, showing the slots and the insert-mounted shafts within the slots, the shafts having mounted on the end thereof the proximal ends of the respective male-die slideable inserts, one insert per shaft.

Figure 8:
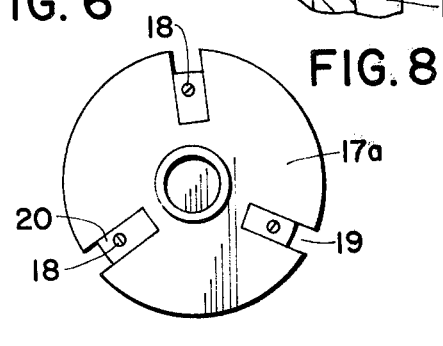

FIG. 8 illustrates a typical view of the embodiment of FIG. 5 after the male insert die has been moved downwardly or alternatively after the support and female die have been moved upwardly together with upward movement of the inserts of the male die (relative to the male die), followed by thereafter (or previously) upward movement of the female die from on top of the molded cap, this view being in cross-section for a better showing of the relative parts thereof as described above, the cross-sectional view about corresponding to that of FIG. 5.

DETAILED DESCRIPTION OF THE INVENTION

For definition and purposes of illustration, I refer to advantages of this type of molded item with reference to solely caps, even though it is clearly contemplated and within the obvious scope of this invention that the molding application of the invention be employed in any other one-piece molded item irrespective of the function of or nature of the particular molded final product as desired.

This illustrated invention relates to the molding of rigid or flexible preferably plastic composition that has internal right angle projections that protrude away from the internal side walls of a cap that has an inside surface that forms the cap top and does not connect to the underside of the cap top.

Side wall protrusions are produced by machining undercuts into the sides of the male portion of a mold. Until now, prior to the present invention, undercuts of approximately ⅛ inch deep could be stripped off the undercut force or male portion of a mold; the material required to strip or eject a one piece plastic item off of an undercut force, has to be flexible, such as of polyethylene. Also, previously, one piece molded plastic items required either unscrewing molds, cam action molds, or lay in molds to produce internally undercut side walls, and these many molding techniques have not been capable of molding the type of cap demanded in the industry, particularly at a rate of production and at an economic cost of production practical for the manufacture thereof. The prior caps have been produced with internal retention prongs, oval or round rings or split rings that terminat at the underside of the cap top.

In contrast, the cap of this invention has an air space between the top of the retention prongs and underside of the cap top. Naturally, to produce such an item, steel or other metal would have to be removed from this gap area to allow the cap to be freed from the lower portion of a force that is undercut. This invention includes a novel molded cap preferably of plastic with gripping ribs for either snap or friction retention to a container, a mounting cup or valve ferrule. Prior to this invention, one piece molded caps that are ejected off of a force had to have retention prongs, rings, or internal or external mounting cup retention fingers connected to the underside of the cap top; with these prior caps, sink marks are the result of a difference of material shrinkage at interrupted wall thickness points. In the present invention, the void of connected molded areas on the under side of the cap top results in a cap top wall of a uniform of uninterrupted thickness.

The air space between the prong top and cap underside results also in a saving of material, and thus reduced cost. Moreover, the airspace allows for a more uniform molded piece because material flow across the top of the force and down the side walls of the force is not interrupted by the paths that straight-through gripping prongs, or other annular projections require.

An additional valuable advantage of the present invention is that the lesser prong length and non-connection to the underside of the cap inner-top allows more flexibility and less stress while being retained mountedly on the mounting cup, valve ferrule or container.

The present invention novel cap is an improvement of the patented cap of the inventor's U.S. Pat. No. 3,450,299, but the present invention also includes the process of its molding production by use of cavityforming inserts slideably inserted within axially extending slots in the male die.

Figure 1:
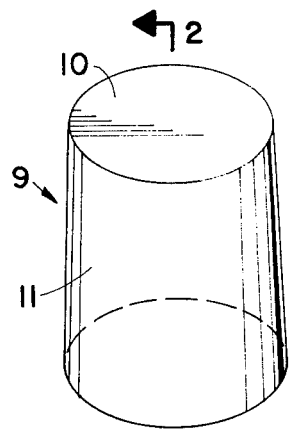
FIG. 1 illustrates in perspective view a typical cap of the present invention.
Figure 2:
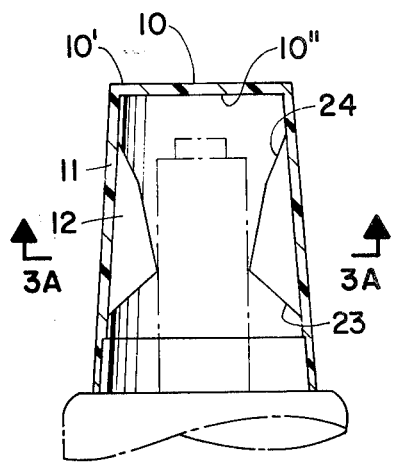
FIG. 2 illustrates a cross-sectional side view of a cap typically of the type shown in FIG. 1 taken along lines 2—2 of FIG. 1, in this embodiment the illustration also showing the typical position of an aerosol bottle—shown in phantom—on which the cap is typically mountable.
Figure 2A:
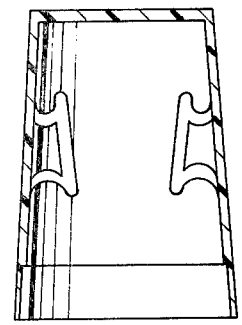
FIGS. 2A, 2B, 2C, 2D, 2E, 2F, 2G and 2H illustrate other typical variations on the shape shown in FIG. 2.
Figure 2B:
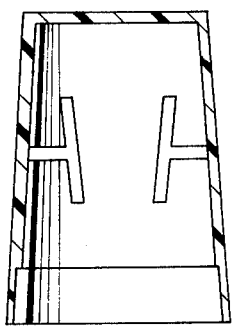

With particular reference to FIGS. 1, 2, and 3A the FIG. 1 discloses in perspective view a typically appearing cap of the present invention having an upper top face of smooth flat characteristic devoid of any recesssinks and thus cap 9 has the novel top substantially horizontal inner wall 10 having upper surface 10' that is receptive of an indicia-printing press-head die (not shown) for the printing of desired information, labelling, designs, etc, as a result of undersurface 10" not being attached to under-hanging projection upper-edge 24. FIG. 2 illustrates in side cross-section the cap top 10 and the lateral walls 11 having extending inwardly therefrom projection 12, a typical relationship of the walls 11 and projection 12 being better seen in the cross-sectional view of FIG. 3 as taken along the lines 3—3 of FIG. 2. The radially-inwardly-facing edge its lower portion 12' extending as and slanted tapered portion, further inwardly than the upper portion 12", whereby lower portion 12" serves as an under-hang latchon the wedge projection 12.

In contrast to the shapes of FIGS. 2 and 3, alternative variations typically are illustrated in the several FIGS. 2A, 2B, 2C, 2D, 2E, 2F, 2G, 2H, 3B, 3C, and 3D.

By comparison of the prior art typical cap construction of FIG. 4A in which the projections are at their upper ends integrally molded-connected with the top 10a, there can be seen that because the projections 12a—as compared to the cap-top 10a thickness—has a projection-length thickness of the measurement of the entire length of the projection along the lateral wall 11a, thereby cooling of the elongated projection all serves to pull downwardly on the top-wall -cooling plastic 11a which 10a thickness is in effect merely an extension of the projection-length thickness 13; the contraction along the entire projection thickness 13 at the points of connection (continuation with the top 10a serves to pull downwardly on the top at those points, while the other parts(portions) of the top 11a are not pulled downwardly except evenly at the points of attachment to the lateral wall 11a, thereby resulting in the sinks 14 (of FIGS. 4 and 4A) in the otherwise smooth top 11a, thereby making the top unsightly as well as making difficult if not impossible the printing thereon mechanically and therefore commercially unacceptable.

The Process of making the cap of this invention is critical and novel, and can be better understood by reference to FIGS. 5 through 8 as follow. The female die 15 has an inverted position relative to the male die 17 inserted upwardly thereinto, with insert 20 has a recess (etched or milled) 22. The female die 15 rests on support 16 having leverage arm annular ring 16' which presses snugly against the outer slideable male die 17 walls and the outer insert 20 walls. Male die 17 has a lever shank 17a, the slot wall 17b thereof being viewable in FIG. 5. The insert 20 is distally mounted on lever shaft 18 extending through slot space 19. As view in the FIG. 6 cross-section, the insert 20 has recess 22 and has a greater thickness 21 at the inward portion thereof in its mounted state within the slot space 19.

Thus, in the above described process, female die 15 is raised after injection, and the ring 16 is raised while force 17 (male die) remains stationary such that the cap 9 and inserts 20 rise, and thereafter ring 16 continues to rise while rod 18 holds stationary such that inserts 20 spring inwardly and/or may be twisted, off-of the molded projections 12.

Note that the insert space 22 may alternatively extend all the way through the thickness (side-to-side of the insert 20, but preferably does not because to do so would provide additional seams for molding leaks which leaks cause "flashes" (unwanted plastic films, filaments, etc.) and because such would produce another "binding" surface increasing the difficulty of raising the cap 9 when the ring 16 moves upwardly during the process.

As illustrated in FIG. 2 and in FIGS. 5 and 8, the recess 22 and consequently the projection 12 is tapered at least at its lower end 23 and preferably also at its upper end 24, so as to facilitate the slide-action in sliding-off, of the insert 20 in its removal from off-of the wedge projection 12 after the injected molding composition has cooled to a hardened state.

Note that FIG. 2 illustrates further how the wedge projections' lower portion 12' fit securingly around any male member such as the spout of an aerosol bottle, for example—shown in phantom, thus anchoring the cap 9 onto the aerosol bottle over the spout.

Figure 2C:
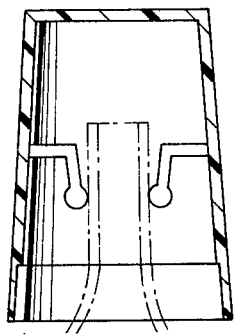

The embodiment of FIG. 2C is a different embodiment of female wedge members securable around a female member such as a spout, for example. The inwardly-directed rounded-ball portion facilitates and enhances the securing action.

Figure 2D:
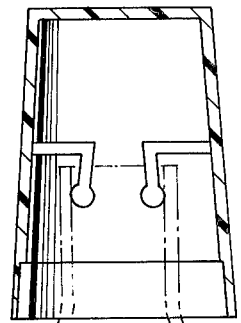
Figure 2E:
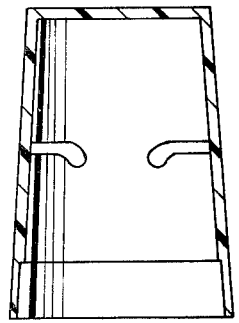

Similarly the FIG. 2D embodiment is advantageous for use as "male" projections each having radially "outwardly" for anchoring a circumscribing female spout wall, extending downwardly into the spout, the spout being shown in phantom.

Figure 2F:
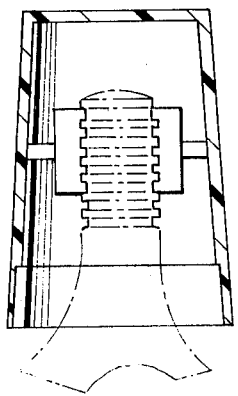
Figure 2G:
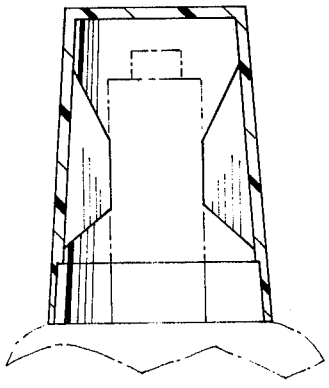
Figure 2H:
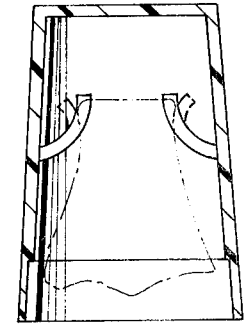

The FIG. 2F embodiment illustrates threaded female projections for screwing down onto a male threaded member—shown in phantom.

It is to be understood that the above description and illustration are for solely the purpose of illustrating the invention for the better understanding thereof, but are not to limit the invention unduly, the invention including all substitutions of equivalents, modifications and variations as would be apparent to a person skilled in this art.

I claim:

1. In an over-cap device having wedge projections extending a major distance radially inwardly and adapted for grasping substantially cylindrical outer walls of a container lid or cap, the improvement comprising in combination: a unitary molded resilient plastic cap means defining a top substantially horizontal inner wall having a periphery and having substantially cylindrical inner side walls downwardly extending from a plurality of points around said periphery, and the cylindrical inner side walls at a plurality of spaced-apart locations having at each of said spaced-apart locations a projection extending radially-inwardly a predetermined distance beneath a lower horizontal face of the top substantially horizontal inner wall, each projection having an upper, upwardly-facing edge spaced-from said lower face; and as mechanism for said grasping by wedge action, at least one of said projection having a radially-inwardly-facing edge; said upwardly-facing edge extending radially inwardly beyond the point of said plurality of points, of attachment the cylindrical inner side wall of the spaced-apart location thereabove.

2. In an over-cap device of claim 1, the improvement further including a plurality of said projections having said radially-inwardly-facing edge.

3. In an over-cap device of claim 2, the improvement further including a lower portion of the radially-inwardly-facing edge being slanted obliquely downwardly and further radially inwardly than an upper portion of the radially-inwardly-facing edge, adapted such that a catch-abutment is thereby formed which latches onto a container top.

4. In an over-cap device of claim 3, the improvement further including said lower portion extending radially-inwardly to an extent less than a radius of said top substantially horizontal inner wall, and in which for said plurality of said projections each projection defines laterally an acute angle to a plane of the downwardly extending wall from the location at from which the respective projection extends.

5. In an over-cap device of claim 3, the improvement further including said lower portion extending as a shaft radially-inwardly to an extent less than a radius of said top substantially horizontal inner wall, and in which for said plurality of said projections includes each projection a finger element extending at about a right angle to said shaft.

6. In an over-cap device of claim 5, the improvement including said finger extending laterally.

7. In an over-cap device of claim 5, the improvement including said finger extending in a plane about upright relative to said top substantially horizontal inner wall.

8. In an over-cap device of claim 1, the improvement further including a lower portion of the radially-inwardly-facing edge being slanted obliquely downwardly and further radially inwardly than an upper portion of the radially-inwardly-facing edge, adapted such that a catch-abutment is thereby formed which latches onto a container top.

* * * * *